Chas. Quartley,
Cigar.

Nº 74,246.          Patented Feb. 11, 1868.

Attest: J. W. Robertson, H. W. Turner.

Charles Quartley

United States Patent Office.

CHARLES QUARTLEY, OF BALTIMORE, MARYLAND.

Letters Patent No. 74,246, dated February 11, 1868.

CIGAR.

The Schedule referred to in these Letters Patent and making part of the same.

TO ALL WHOM IT MAY CONCERN:

Be it known that I, CHARLES QUARTLEY, of the city and county of Baltimore, and State of Maryland, have invented certain new and useful Improvements in Cigars; and I do hereby declare that the following is a full and exact description of the same, reference being had to the accompanying drawings, forming part of this specification, in which—

Figure 1:

Figure 1 is a side view, and

Figure 2:

Figure 2 an end view of my improvement aforesaid.

My invention consists in making cigars or cigarettes so that they shall ignite by friction, by means of a composition applied to the end thereof, in the manner hereinafter described; and in the use of a certain ingredient as one of the material portions of the igniting-composition.

To enable those skilled in the art to which this pertains to make and use my invention, I will proceed to describe it, and the materials used therefor.

I take, of tobacco, eight pounds; saltpetre, twelve pounds; charcoal, one pound. These ingredients I mix with sufficient dissolved shellac to make a mass of the consistency of stiff paste.

When the cigars or cigarettes have been finished in the usual manner, I take them, one at a time, and apply a portion of the above composition evenly over the end of the cigar, (as shown at B,) with a small knife or any other convenient instrument, or they may be dipped into the composition, a number of them at once, but I prefer the former method. The cigars are then laid aside for a short time, and, as soon as the composition becomes hard enough, a small portion of any of the ordinary match-compositions, of which phosphorus is usually the main ingredient, is placed in the centre of the first composition, as shown at A.

After this composition has burned out, it leaves a live coal on the end of the cigar, which usually continues in this condition for some time, so that the smoker need not immediately draw on it. This coal lights the cigar in a perfectly even and regular manner, so that the cigar does not burn on one side, as is usually the case when lighted in the ordinary way with matches, &c.

I am aware that it has been proposed to insert a match in the end of a cigar, so as to ignite it by friction, but this would be injurious to the smoker and spoil the flavor of the cigar. This I do not claim; but What I do claim, and desire to secure by Letters Patent, is—

As a new article of manufacture, the cigar or cigarette, having the ends coated with the composition herein described, and providing it with a fulminating-compound, as and for the purpose set forth.

This specification of my invention signed by me, this 17th day of September, 1867.

CHARLES QUARTLEY.

Witnesses:
 THOMAS ROBERTSON,
 CHARLES H. MYERS.